United States Patent
Van Der Tuijn et al.

(10) Patent No.: US 8,073,045 B2
(45) Date of Patent: Dec. 6, 2011

(54) METHOD AND A SYSTEM FOR GENERATING AN ADAPTIVE SLICER THRESHOLD

(75) Inventors: Roland Mattheus Maria Hendricus Van Der Tuijn, Mouans Sartoux (FR); Yoann Bouvet, Antibes (FR)

(73) Assignee: ST-Ericsson SA, Geneva (CH)

( * ) Notice: Subject to any disclaimer, the term of this patent is extended or adjusted under 35 U.S.C. 154(b) by 898 days.

(21) Appl. No.: 10/584,503

(22) PCT Filed: Dec. 15, 2004

(86) PCT No.: PCT/IB2004/004191
§ 371 (c)(1), (2), (4) Date: Jun. 22, 2006

(87) PCT Pub. No.: WO2005/067240
PCT Pub. Date: Jul. 21, 2005

(65) Prior Publication Data
US 2007/0153938 A1    Jul. 5, 2007

(30) Foreign Application Priority Data
Dec. 24, 2003  (EP) ..................... 03300291

(51) Int. Cl.
- H03H 7/30 (2006.01)
- H03H 7/40 (2006.01)
- H03K 5/159 (2006.01)

(52) U.S. Cl. ........ 375/230; 375/316; 375/317; 375/340; 375/342

(58) Field of Classification Search ................. 375/340, 375/342, 316, 317, 230; 358/283, 280, 284, 358/282
See application file for complete search history.

(56) References Cited

U.S. PATENT DOCUMENTS

| | | | | |
|---|---|---|---|---|
| 3,310,751 A * | 3/1967 | Atzenbeck | .................... | 327/166 |
| 4,709,274 A * | 11/1987 | Tanioka | ........................ | 358/2.1 |
| 5,627,860 A | 5/1997 | McKinny et al. | | |
| 5,673,197 A | 9/1997 | Keba | | |
| 5,825,243 A | 10/1998 | Sato et al. | | |
| 5,896,422 A | 4/1999 | Lu | | |
| 5,930,307 A | 7/1999 | DeLuca | | |
| 6,246,723 B1 * | 6/2001 | Bliss et al. | ..................... | 375/265 |
| 6,272,102 B1 * | 8/2001 | Kahlman | ................. | 369/124.01 |
| 6,735,260 B1 * | 5/2004 | Eliezer et al. | ................. | 375/316 |

(Continued)

FOREIGN PATENT DOCUMENTS

EP 0 695 064   1/1996
(Continued)

OTHER PUBLICATIONS

Darabi et al: "An IF FSK Demodulator for Bluetooth in 0.35/SPL MU/M CMOS"; IEEE Custom Integrated Circuits Conference; May 6, 2001; pp. 523-526.

Primary Examiner — David C. Payne
Assistant Examiner — Erin File
(74) Attorney, Agent, or Firm — William J. Kubida; Peter J. Meza; Hogan Lovells US LLP

(57) ABSTRACT

An adaptive slicer threshold is derived from averages of maximum and minimum values of the received signal, the method comprising the steps of: —averaging (86) several detected maximum values and averaging several detected minimum values, and —calculating (86) the slicer threshold from these average minimum and maximum values.

11 Claims, 3 Drawing Sheets

U.S. PATENT DOCUMENTS

| | | | |
|---|---|---|---|
| 7,128,270 B2 * | 10/2006 | Silverbrook et al. | 235/472.01 |
| 2002/0024846 A1 * | 2/2002 | Kawahara et al. | 365/185.24 |
| 2003/0081697 A1 * | 5/2003 | Little | 375/317 |
| 2005/0066083 A1 * | 3/2005 | Chan et al. | 710/52 |
| 2006/0034182 A1 * | 2/2006 | Draper et al. | 370/252 |
| 2006/0108517 A1 * | 5/2006 | Draper et al. | 250/238 |

FOREIGN PATENT DOCUMENTS

| | | | |
|---|---|---|---|
| GB | 1566169 | * | 12/1977 |
| WO | WO 03/039060 | | 5/2003 |

* cited by examiner

METHOD AND A SYSTEM FOR GENERATING AN ADAPTIVE SLICER THRESHOLD

FIELD OF THE INVENTION

The present invention relates to a method and a system of generating an adaptative slicer threshold.

More precisely, the invention relates to a method of generating an adaptative slicer threshold, the method comprising the steps of:
  detecting a maximum value of the signal over a predetermined period for at least two periods, and
  detecting a minimum value of the signal over a predetermined period for at least two periods.

Data communication using demodulated binary signals takes place at high rates in various applications, for example, in wireless systems like DECT (Digital European Cordless Telecommunication) or Bluetooth. In such binary data communication systems, a receiver is used for receiving the binary signals from a transmitter. In many cases, the signals received are of a low level and are accompanied by noise and/or jitter. The true binary nature of a distinct rectangular pulse, usually designating a binary one, sometimes can be partly obscured by noise, and results in data errors that adversely affect signal processing equipment to which the output of the receiver is applied.

To improve the ability to accurately recapture the binary signal passing through the receiver before being supplied to other pieces of equipment, a slicing technique is employed. This technique involves slicing the received binary signal at a level about the midpoint of its amplitude, that is, between its maximum and minimum values. The portion of the received binary signal appearing above the slicing level corresponds, for example, to a binary one and the portion below the slicing level corresponds to a binary zero. This slicing technique is carried out by a slicer circuit. The slicing level used by the slicer circuit is called slicer threshold. This slicer threshold has to be generated from the received binary signal.

Typically, the slicer threshold is varied so as to be at the midpoint of the amplitude of the binary signal, wherein the midpoint is calculated to be the average of one maximum and one minimum value of the received binary signal. Such a method is disclosed in WO 03/039060.

The maximum and minimum values are absolute values. Therefore, the slicer threshold is sensitive to noise, especially when the noise introduces large peaks in the received binary signal, which peaks will directly change the slicer threshold.

Thus there is a need for a method of generating a slicer threshold that is less sensitive to noise.

SUMMARY OF THE INVENTION

Accordingly it is an object of the invention to provide a method of generating an adaptative slicer threshold with an improved noise insensibility.

With the following and other objects in view there is provided in accordance with the invention, a method as described above which comprises the steps of:
  averaging several detected maximum values and averaging several detected minimum values, and
  calculating the slicer threshold from these average minimum and maximum values.

In the above method, the slicer threshold is calculated from the average of several maximum values and several minimum values. Therefore, the slicer threshold is less sensitive to noise.

The features as defined in claim 2 have the advantage that the method obviates the need for a complicated leakage function.

The features as defined in claims 3 and 4 have the advantage that the method results in a good noise insensitivity as well as a fast time response to changes in the level of the binary signal to be sliced.

The features of claims 5 and 6 have the advantage that in case of long logic one or logic zero sequences in the binary signal, the slicer threshold value is not impacted.

Other features of the claimed method are recited in the dependent claims.

The invention also relates to a system for generating an adaptative slicer threshold according to the above method.

DESCRIPTION OF THE PREFERRED EMBODIMENTS

Figure 1:
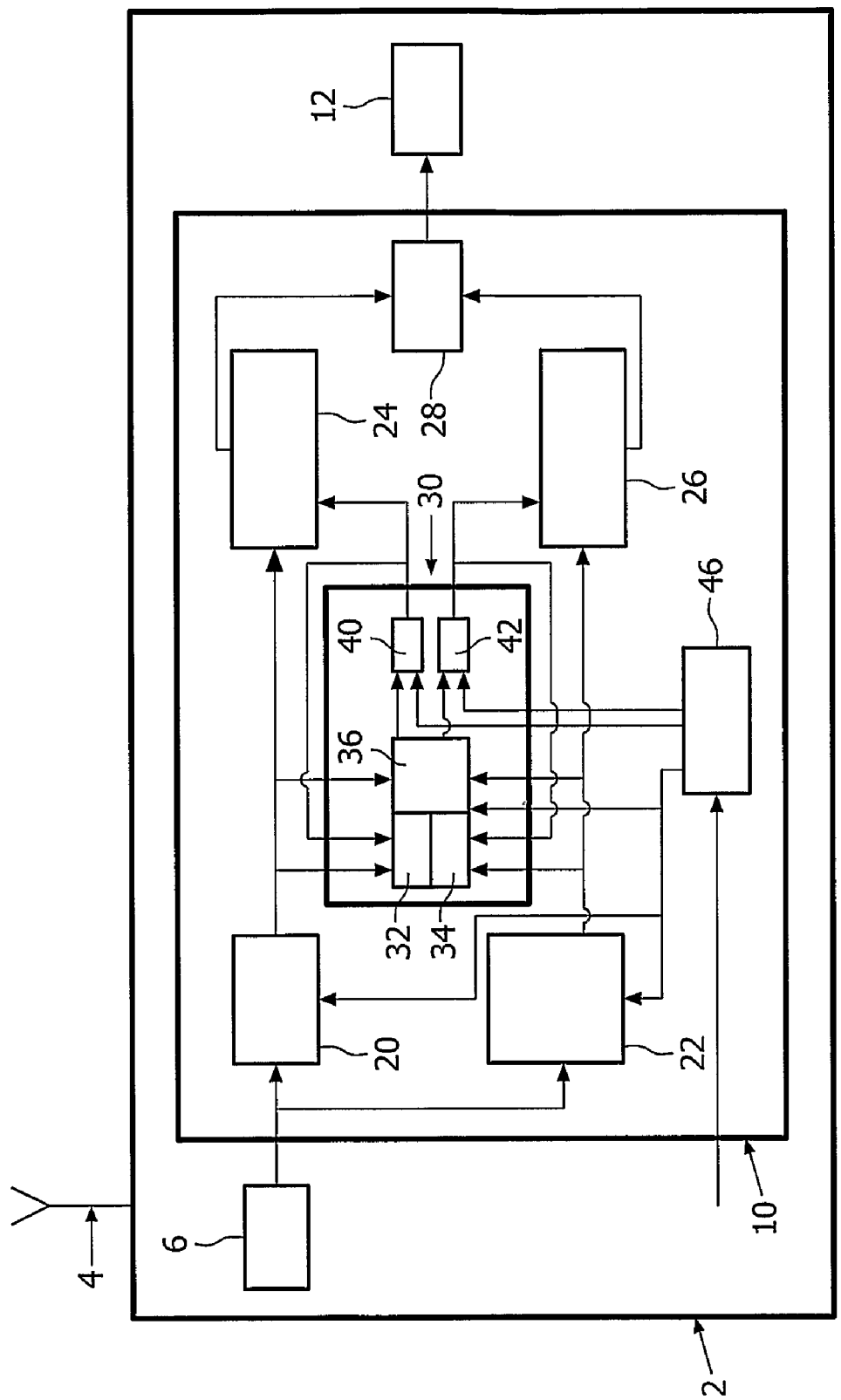
FIG. 1 is a schematic diagram of a system for generating an adaptative slicer threshold according to the invention.

FIG. 1 shows a wireless receiver 2 intended to be used in a Bluetooth wireless communication system. Only the elements of receiver 2 that are necessary for the understanding of the invention are illustrated.

In order to receive a modulated radio signal, receiver 2 comprises an antenna 4, a demodulator 6 to demodulate the received radio signal, a circuit 10 to generate an adaptative slicer threshold, and a slicer circuit 12 capable of slicing a binary signal according to the slicer threshold generated by circuit 10.

Demodulator 6 is designed to convert the received modulated signal into a demodulated received signal applied to a first input of circuit 10. The demodulated signal is a binary signal that is a two-state signal separated by transitions to move from one state to the other.

Figure 3:
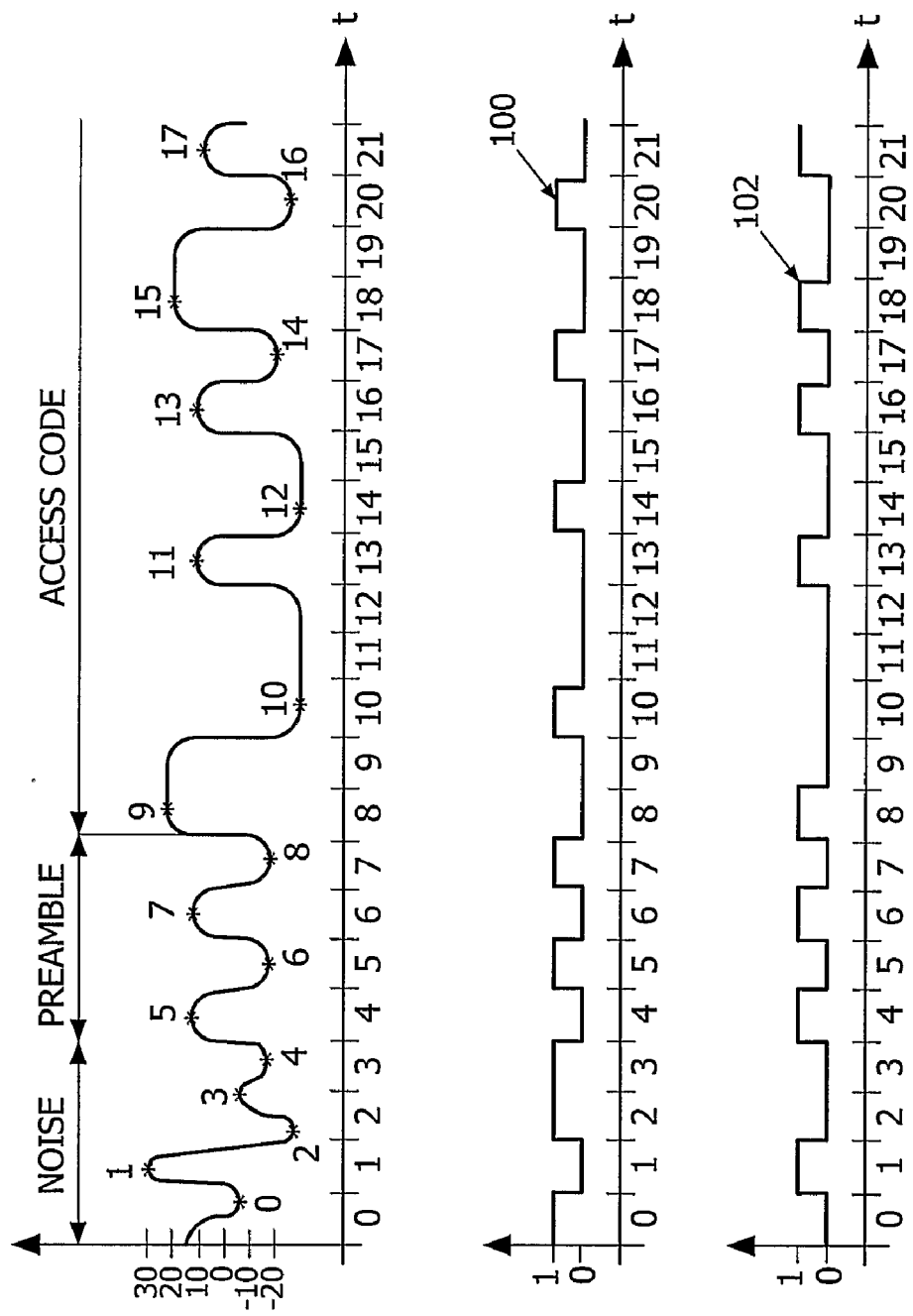
FIG. 3 is a graphical illustration of the time evolution of a binary signal to be sliced.

A curve 16 of the graph of FIG. 3 represents the time evolution of an example of such a binary signal. The x-axis is graduated in micro-seconds and the y-axis represents the amplitude of the binary signal and is graduated from −20 to 30.

In a typical Bluetooth wireless communication system, a received message starts with a preamble of, for example, four bits. Here, the illustrated preamble occurs between 4 and 8 micro-seconds and is composed of the binary sequence "1010". In a Bluetooth wireless system, a one bit period is equal to 1 µs.

After the preamble, the received message comprises an access code and then other information. In the graph of FIG. 3, only the fourteen first bits of the access code are shown.

In the absence of a message, the receiver 2 receives noise. An example of the binary signal evolution when the receiver 2 only receives noise is illustrated between 0 and 4 micro-seconds in the graph of FIG. 3.

Demodulator 6 and slicer circuit 12 are conventional and will not be described herebelow in detail.

Circuit 10 has a second input to receive an oversampled clock signal and an output connected to the slicer circuit in order to output the value of the slicer threshold.

Circuit 10 has a maximum peak detector 20 and a minimum peak detector 22 connected to the first input.

Detectors 20 and 22 are designed to detect a maximum peak and a minimum peak respectively over a one bit period.

The maximum peak and the minimum peak correspond to the points of curve 16 where the first-order derivative is zero. For a maximum peak, the second-order derivative is negative whereas for a minimum peak the second-order derivative is positive.

In the graph of FIG. 3, the peaks of the binary signal are successively numbered from 0 to 17.

In order to detect the maximum peak over a one bit period, the detector 20 detects a peak if the previous and following values of the binary signal are smaller than the peak value and hold the highest peak value detected over this one bit period.

Similarly, detectors 22 detect a peak if the previous and the following value of the binary signal are higher than the peak value and hold the smallest peak value detected over this one bit period.

Detectors 20 and 22 are arranged to hold and to output the value of the maximum and minimum detected peaks on respective outputs.

In order to store four successive maximum peak values and four successive minimum peak values, the circuit 10 comprises two memories 24 and 26 arranged according to a FIFO (First In First Out) technique. For example, each memory is realised with a four cells shift register. Thus, shift registers 24 and 26 work, so that the most recently stored value replaces the oldest one.

The output of detector 20 is connected to an input of shift register 24 and the output of detector 22 is connected to an input of shift register 26.

To calculate the value of the slicer threshold, circuit 10 has an averaging unit 28, which is connected to outputs of shift registers 24 and 26 respectively. Averaging unit 28 is capable of calculating the average of the four values stored in respective cells of shift register 24 and the average of the four values stored in respective cells of shift register 26. The calculated average is outputted by unit 28 to slicer circuit 12 as the value of the slicer threshold.

To calculate a slicer threshold which is independent of long logic "1" or "0" sequences in the binary signal, even in case of a binary signal with noise, the circuit 10 has a bit level detector 30. Detector 30 is designed to activate the storage of a new value in shift registers 24 and 26 only upon occurrence of a bit level change.

To do so, detector 30 comprises two memory buffers 32, 34. The buffer 32 is designed to store the previous maximum detected peak value and is connected to the output of detector 20.

Buffer 34 is designed to store the previous minimum detected peak value and is connected to the output of detector 22.

A previous peak value refers to the most recently stored value of a peak in shift register 24 or 26.

A slope detector 36, designed to detect a rising slope or falling slope in the binary signal, is associated with buffers 32 and 34 and is connected to the outputs of detectors 20 and 22.

To detect a rising slope, the slope detector compares the current maximum peak value, if there exists any at the output of detector 20, to the value of the previous minimum peak stored in the buffer 34. A rising slope is detected only if the current maximum peak value is higher than the previous minimum peak value plus a predetermined threshold.

To detect a falling slope, the slope detector compares the current minimum peak value, if there exists any at the output of detector 22, to the value of the previous maximum peak stored in buffer 32. A falling slope is detected only if the previous maximum peak value is higher than the current minimum peak value plus a predetermined threshold.

When a rising slope or a falling slope is detected, detector 36 generates a logic one on a first output and a second output respectively.

The first output of detector 36 is connected to a first input of an AND gate 40. The second output of detector 36 is connected to a first input of an AND gate 42.

Second inputs of gates 40 and 42 respectively are connected to a one bit period counter 46.

An output of the AND gate 40 is connected to a clock input of shift register 24 and an output of the AND gate 42 is connected to a clock input of shift register 26. Therefore, when a rising slope is detected by detector 36 at the end of the one bit period, the shift register 24 is activated in order to store the current maximum peak value held by detector 20.

Similarly, when a falling slope is detected by detector 36, at the end of the one bit period, shift register 26 is activated to store the current minimum peak value held by detector 22.

The output of gates 40 and 42 is also connected to a storage activation input of buffers 32 and 34 respectively.

Counter 46 is also connected to a reset input of detectors 20, 22 and 36 in order to reset these detectors at the end of each one bit period.

Counter 46 counts the one bit period using the over sampled clock received by circuit 10.

Figure 2:
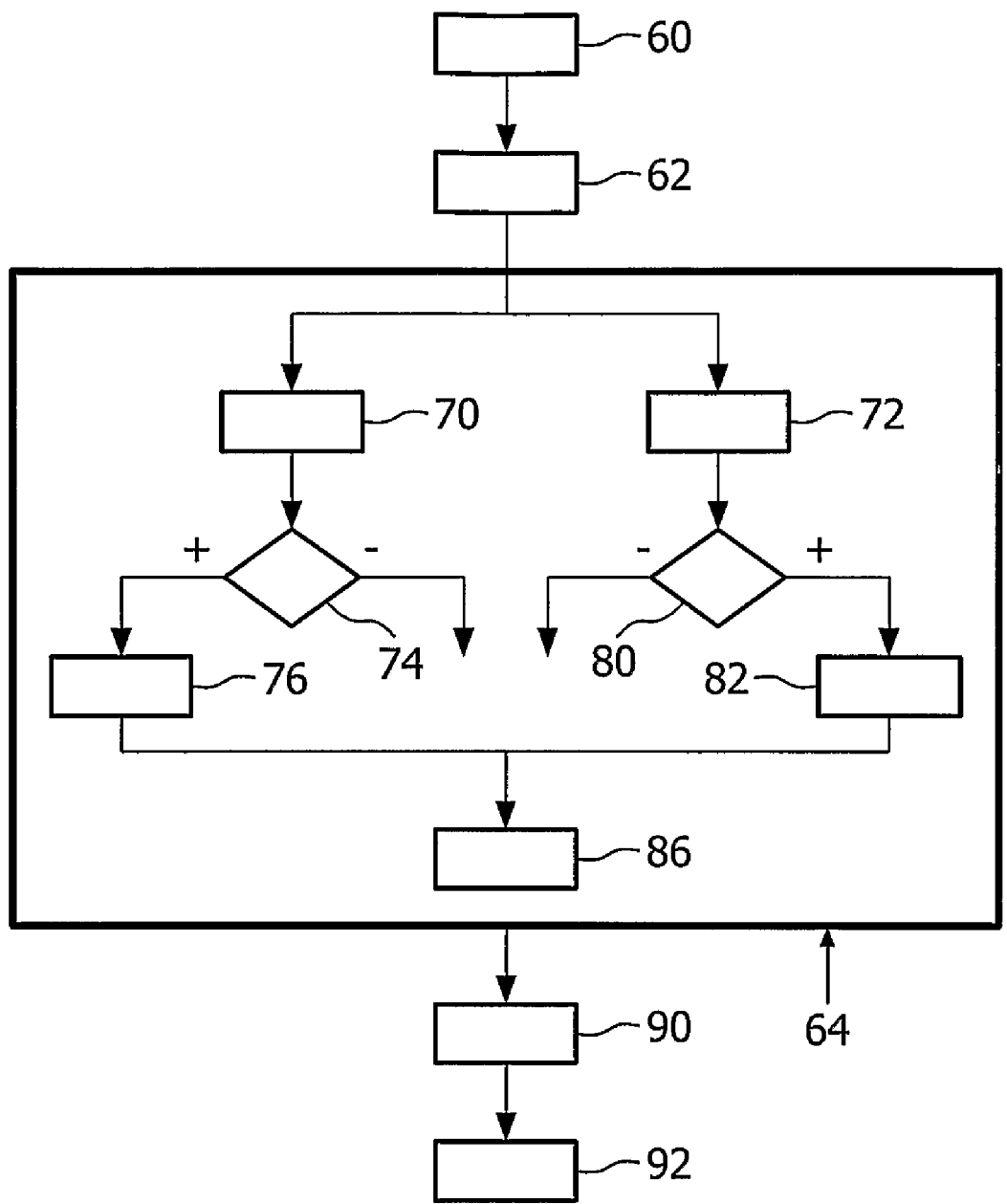
FIG. 2 is a flow chart of a method for generating an adaptative slicer threshold according to the invention.

The way in which receiver 2 works, will now be explained with reference to FIG. 2.

First, in step 60, noise or a message is received through antenna 4, filtered, and transmitted to demodulator 6.

Demodulator 6 demodulates, in step 62, the received signal and transmits the corresponding binary signal to circuit 10.

Circuit 10 generates, in step 64, the slicer threshold delivered to slicer circuit 12 from the received binary signal.

More precisely, during step 64, detector 20 detects, during an operation 70, the maximum peak value of the binary signal for the current one bit period. If a current maximum peak is detected during the current one bit period, the value of the maximum peak is held at its output.

In parallel, detector 22 detects, during an operation 72, the minimum peak value of the binary signal during the current one bit period. If a current minimum peak is detected during the current one bit period, its value is held at its output.

If no current maximum or minimum peak value is detected during the current one bit period, no value is outputted by the corresponding detector 20 or 22.

During operation 74, the current maximum peak value held at the output of detector 20, if there is any, is compared by the slope detector 36 to the previous minimum peak value stored in buffer 34. If there is a current maximum peak value which is markedly higher than the previous minimum peak value, detector 36 transmits a logic one to the first input of gate 40. So, at the end of the current one bit period, shift register 24 is activated, during an operation 76, to store the current maximum peak value and to delete the oldest stored maximum peak value.

If no maximum peak is detected during the current one bit period or if the value of the difference between the current maximum peak value and the previous minimum peak value is not higher than a predetermined threshold, detector 36 transmits a logic "0" to gate 40 and shift register 24 is not activated. Therefore, when no rising slope is detected, no new maximum peak value is stored in shift register 24.

Detector 36 also compares, during an operation 80, the current minimum peak value, if there is any, to the previous maximum peak value stored in the buffer 32.

If during the current one bit period a current minimum peak has been detected, the value of which is markedly lower than the value of the previous maximum peak, detector 36 transmits a logic "1" to the first input of gate 42. Consequently, shift register 26 is activated, during an operation 82, at the end of the current one bit period. So, the current minimum peak value is stored in shift register 26 and the oldest stored minimum peak value is deleted.

In a similar way as for a rising slope, when no falling slope is detected, no new minimum peak value is stored in shift register 24.

At the end of the current one bit period, detectors 20, 22 and 36 are reset and then operations 70 to 82 are repeated once again for the next one bit period.

Every one bit period, one average maximum peak value and one average minimum peak value are calculated and used by unit 28 to calculate the value of the slicer threshold during an operation 86. For example, the slicer threshold value is calculated in one operation using the following relation:

$$SS=(Max1+Max2+Max3+Max4+Min1+Min2+Min3+Min4)/8$$

where:

SS is the value of the slicer threshold,

Max1 to Max4 are the four maximum peak values stored in shift register 24, and

Min1 to Min4 are the four minimum peak values stored in shift register 26.

The calculated value of the slicer threshold is then set in slicer circuit 12, in step 90.

Slicer circuit 12 uses the slicer threshold value to identify logic "1" or logic "0" in the binary signal, in step 92.

In order to fully understand the advantages of the above-described method of generating an adaptive slicer threshold, numerical examples will be given below in the particular case of the binary signal illustrated by the curve shown in FIG. 3.

In FIG. 3, a curve 100 and a curve 102 represent the time evolution respectively of the falling slope signal and the rising slope signal generated by detector 36.

The following table contains of FIG. 3, the different values of the elements of circuit 10 used to detect a falling slope or a rising slope for the twenty two one bit periods illustrated in the graph.

More precisely, the first column contains the number of the one bit period illustrated on the graph of FIG. 3.

The second and third columns contain the values of the previous and the current maximum peaks respectively.

The fourth and fifth columns contain the value of the previous and the current minimum peaks respectively.

Finally, columns 7 and 8 contain the value of the falling slope signal and of the rising slope signal respectively generated by slope detector 36.

In this table the value of the current maximum peak is replaced by terms "no max" when no current maximum peak value occurs during the current one bit period. Similarly, the value of the current minimum peak is replaced by terms "no min" when no minimum peak value occurs during the current one bit period.

The terms "peak X" refer to the peak number X which is illustrated in curve 16.

| One bit period number | Previous Max | Current Max | Previous Min | Current Min | Falling slope | Rising slope |
|---|---|---|---|---|---|---|
| 0 | 15 | No max | 0 | −5 (peak 0) | 1 | 0 |
| 1 | 15 | 30 (peak 1) | −5 | No min | 0 | 1 |
| 2 | 30 | −5 (peak 3) | −5 | −25 (peak 2) | 1 | 0 |
| 3 | −5 | No max | −25 | −15 (peak 4) | 1 | 0 |
| 4 | −5 | 15 (peak 5) | −15 | No min | 0 | 1 |
| 5 | 15 | No max | −15 | −15 (peak 6) | 1 | 0 |
| 6 | 15 | 15 (peak 7) | −15 | No min | 0 | 1 |
| 7 | 15 | No max | −15 | −15 (peak 8) | 1 | 0 |
| 8 | 15 | 25 (peak 9) | −15 | No min | 0 | 1 |
| 9 | 25 | No max | −15 | No min | 0 | 0 |
| 10 | 25 | No max | −15 | −25(peak 10) | 1 | 0 |
| 11 | 25 | No max | −25 | No min | 0 | 0 |
| 12 | 25 | No max | −25 | No min | 0 | 0 |
| 13 | 25 | 15 (peak 11) | −25 | No min | 0 | 1 |
| 14 | 15 | No max | −25 | −25(peak 12) | 1 | 0 |
| 15 | 15 | No max | −25 | No min | 0 | 0 |
| 16 | 15 | 15 (peak 13) | −25 | No min | 0 | 1 |
| 17 | 15 | No max | −25 | −15(peak 14) | 1 | 0 |
| 18 | 15 | 25 (peak 15) | −15 | No min | 0 | 1 |
| 19 | 25 | No max | −15 | No min | 0 | 0 |
| 20 | 25 | No max | −15 | −20(peak 16) | 1 | 0 |
| 21 | 25 | 15 (peak 17) | −20 | No min | 0 | 1 |

It should be noted that during one bit period no. 2, no rising slope is detected since the value of peak 3 is equal to the value of the previous minimum peak (peak 0).

During one bit period no. 9 and during one bit period no. 11 neither shift register 24 nor shift register 26 is activated since this corresponds to a long logic "1" sequence and a long logic "0" sequence, respectively. Therefore, even if the amplitude of the binary signal corresponding to a long logical "1" or "0" sequence varies due to noise, for example, only one maximum or minimum peak value is stored. Consequently, the generated slicer threshold is not sensitive to long logical "1" or "0" sequences in the binary signal.

The following table 2 illustrates the calculation of the slicer threshold value in the particular case of curve 16.

The first column contains the one bit period number.

The second to fifth columns contain the four last maximum peak values stored in shift register 24.

The sixth to ninth columns contain the four last minimum peak values stored in shift register 26.

The last column contains the value of the slicer threshold calculated by unit 28.

| Peak number | Max1 | Max2 | Max3 | Max4 | Min1 | Min2 | Min3 | Min4 | Average |
|---|---|---|---|---|---|---|---|---|---|
| 0 | 0 | 0 | 0 | 0 | −5 | 0 | 0 | 0 | −0.625 |
| 1 | 30 | 0 | 0 | 0 | −5 | 0 | 0 | 0 | 3.125 |
| 2 | 30 | 0 | 0 | 0 | −25 | −5 | 0 | 0 | 0 |
| 3 | 30 | 0 | 0 | 0 | −15 | −25 | −5 | 0 | −1.875 |
| 4 | 15 | 30 | 0 | 0 | −15 | −25 | −5 | 0 | 0 |
| 5 | 15 | 30 | 0 | 0 | −15 | −15 | −25 | −5 | −1.875 |
| 6 | 15 | 15 | 30 | 0 | −15 | −15 | −25 | −5 | 0 |
| 7 | 15 | 15 | 30 | 0 | −15 | −15 | −15 | −25 | 1.25 |
| 8 | 25 | 15 | 15 | 30 | −15 | −15 | −15 | −25 | 1.875 |
| 9 | 25 | 15 | 15 | 30 | −15 | −15 | −15 | −25 | 1.875 |
| 10 | 25 | 15 | 15 | 30 | −25 | −15 | −15 | −15 | 1.875 |
| 11 | 25 | 15 | 15 | 30 | −25 | −15 | −15 | −15 | 1.875 |
| 12 | 25 | 15 | 15 | 30 | −25 | −15 | −15 | −15 | 1.875 |
| 13 | 15 | 25 | 15 | 15 | −25 | −15 | −15 | −15 | 0 |
| 14 | 15 | 25 | 15 | 15 | −25 | −25 | −15 | −15 | −1.25 |
| 15 | 15 | 25 | 15 | 15 | −25 | −25 | −15 | −15 | −1.25 |
| 16 | 15 | 15 | 25 | 15 | −25 | −25 | −15 | −15 | −1.25 |
| 17 | 15 | 15 | 25 | 15 | −15 | −25 | −25 | −15 | −1.25 |

-continued

| Peak number | Max1 | Max2 | Max3 | Max4 | Min1 | Min2 | Min3 | Min4 | Average |
|---|---|---|---|---|---|---|---|---|---|
| 18 | 25 | 15 | 15 | 25 | −15 | −25 | −25 | −15 | 0 |
| 19 | 25 | 15 | 15 | 25 | −15 | −25 | −25 | −15 | 0 |
| 20 | 25 | 15 | 15 | 25 | −20 | −15 | −25 | −25 | 0.625 |
| 21 | 15 | 25 | 15 | 15 | −20 | −15 | −25 | −25 | −1.875 |

First it can be noticed that if a large peak occurs due to noise, its consequences on the slicer threshold value are limited due to the use of a running average. Therefore, noise insensitivity is increased.

Secondly, the value of the slicer threshold may rapidly move up or down in case of modification in the binary signal level, since only four values are used to calculate the average maximum peak value and the average minimum peak value. So after a time period of at least eight one bit periods, the influences of the noise present before the preamble is nearly eliminated. The generated slicer threshold is therefore not sensitive to the noise preceding the preamble.

Thirdly, due to the use of running averages, the average maximum peak value and the average minimum peak value are regularly updated and therefore there is no more need for a slow and complicated leakage function as the one described in WO 03/039060. The leakage function is a time varying function which is used to decrease the value of the last maximum value and to increase the value of the last minimum value as a function of the elapsed time.

Here, the method has been described in the particular case where the average maximum peak value or the average minimum peak value is calculated using four values. This number of four values has been determined as an optimal solution between the noise insensitivity and the response time of the circuit 10 to changes in the binary signal level. This value of four is particularly well suited for Bluetooth wireless communication systems. However, other acceptable values range from 2 to 6. For wireless communication systems like DECT or Bluetooth a running average over more than six values results in an unacceptably slow response time. This number is dependent on the specification of the communication system in which the receiver is to be implemented.

The method has been described in the particular case where only one maximum peak value and/or only one minimum peak value is detected during a one bit period. However, in another embodiment, the predetermined period over which only one maximum peak value and/or only one minimum peak value is determined may be set to different values. For example, the predetermined period may be equal to more than one bit period.

The invention claimed is:

1. A method of generating an adaptive slicer threshold from a received demodulated signal, the method comprising:
    detecting a maximum value of the signal over a predetermined period;
    storing said detected maximum value only upon occurrence of a bit level change detected by a slope detector computing a difference between said maximum value with a previously stored minimum value and comparing said difference with respect to a first value;
    detecting a minimum value of the signal over a predetermined period;
    storing said detected minimum value only upon occurrence of a bit level change detected by said slope detector computing a difference between said minimum value with a previously stored maximum value and comparing said difference with respect to a second value;
    averaging a number of stored maximum values and averaging a number of stored minimum values; and
    calculating the slicer threshold from the average minimum and maximum values.

2. The method according to claim 1, wherein the averages of the maximum and minimum values are calculated using a running average over the n last successive selected maximum or minimum values, n being a predetermined integer greater than 1.

3. The method according to claim 1, wherein n ranges from 2 to 6.

4. The method according to claim 3, wherein n is equal to 4.

5. The method according to claim 1, wherein the step of detecting a maximum value comprises the operations of:
    detecting a maximum peak of the signal during the predetermined period, the maximum signal peak corresponding to a point where the signal first-order derivative is zero and the signal second-order derivative has a negative value, and
    holding the value of the detected maximum peak as the maximum value over the predetermined period.

6. The method according to claim 1, wherein the step of determining the minimum value comprises the operations of:
    detecting a minimum peak of the signal during the predetermined period, the minimum signal peak corresponding to a point where the signal first-order derivative is zero and where the signal second-order derivative has a positive value, and
    holding the value of the detected minimum peak as the minimum value over the predetermined period.

7. The method according to claim 5, wherein a new detected maximum value is used to calculate the average maximum value only if a minimum peak has been detected during the previous predetermined period, and a new detected minimum value is used to calculate the average minimum value only if a maximum peak has been detected during the previous predetermined period.

8. A system for generating an adaptive slicer threshold from a received demodulated signal, the system comprising:
    a first detector to detect a maximum value of the signal over a predetermined period;
    a bit level detector for detecting bit level change by computing a difference between said maximum value and a previously stored minimum value and comparing said difference with respect to a first value;
    a register for storing said detected maximum value only upon occurrence of a bit level change;
    a second detector for detecting a minimum value of the signal over a predetermined period; and
    a register for storing said detected minimum value only upon occurrence of a bit level change by computing a difference between said minimum value and a previously stored maximum value and comparing said difference with respect to a second value,
    wherein the system comprises an averaging unit operable to average a number of stored maximum values, to average a number of stored minimum values, and to calculate the slicer threshold from the average minimum and maximum values.

9. The system according to claim 8, wherein it further comprises at least one FIFO memory to store said several maximum values and said several minimum values to be averaged.

10. The system according to claim 8, wherein the first and/or second detectors are a maximum peak detector and a minimum peak detector, respectively.

11. The system according to claim 8, wherein the system comprises a bit level detector associated with said at least one memory in order to activate the storage of a new minimum or maximum value only if a bit level change has been detected.

* * * * *